(12) United States Patent
Kister et al.

(10) Patent No.: US 10,058,936 B2
(45) Date of Patent: Aug. 28, 2018

(54) DOUBLE-SIDED MILLING CUTTING INSERT AND MILLING TOOL

(71) Applicant: CERATIZIT LUXEMBOURG S.A.R.L., Mamer (LU)

(72) Inventors: Fabien Kister, Metz (FR); Damien Bazillon, Haucourt (FR)

(73) Assignee: Ceratizit Luxembourg S.A.R.L., Mamer (LU)

( * ) Notice: Subject to any disclaimer, the term of this patent is extended or adjusted under 35 U.S.C. 154(b) by 206 days.

(21) Appl. No.: 15/116,248

(22) PCT Filed: Jan. 27, 2015

(86) PCT No.: PCT/EP2015/000142
§ 371 (c)(1),
(2) Date: Aug. 3, 2016

(87) PCT Pub. No.: WO2015/117733
PCT Pub. Date: Aug. 13, 2015

(65) Prior Publication Data
US 2017/0014919 A1   Jan. 19, 2017

(30) Foreign Application Priority Data
Feb. 4, 2014  (AT) .................................. GM51/2014

(51) Int. Cl.
*B23C 5/20* (2006.01)
*B23C 5/06* (2006.01)

(52) U.S. Cl.
CPC ............... *B23C 5/207* (2013.01); *B23C 5/06* (2013.01); *B23C 5/202* (2013.01);
(Continued)

(58) Field of Classification Search
CPC ... B23B 2200/3681; B23C 5/06; B23C 5/202; B23C 5/207; B23C 2200/125;
(Continued)

(56) References Cited

U.S. PATENT DOCUMENTS

| 5,007,775 A | * | 4/1991 | Pantzar | .................... B23C 5/207 407/113 |
| 5,904,450 A | * | 5/1999 | Satran | ..................... B23C 5/202 407/113 |

(Continued)

FOREIGN PATENT DOCUMENTS

| CH | 558693 A | * | 2/1975 | ........... B23B 27/141 |
| DE | 102008001898 A1 | | 11/2008 | |

(Continued)

*Primary Examiner* — Sara Addisu
(74) *Attorney, Agent, or Firm* — Laurence A. Greenberg; Werner H. Stemer; Ralph E. Locher

(57) ABSTRACT

A double-sided milling cutting insert has a first cutting edge disposed at an intersection of a top side and a side surface and a second cutting edge disposed at an intersection of a bottom side and the side surface. Each of the first and second cutting edges contains three cutting edge portions which are useable by indexing. The cutting edge portions each have a cutting corner, a main cutting edge adjacent to one side of the cutting corner, and a wiper edge adjacent to the other side of the cutting corner. The main cutting edge and the wiper edge are each inclined towards a reference plane with increasing distance from the cutting corner such that the first and second cutting edges have the largest distance to the reference plane in the regions of the cutting corners. The side surface has main clearance surfaces, secondary clearance surfaces, and curved corner surfaces.

13 Claims, 3 Drawing Sheets

(52) U.S. Cl.
CPC ............... *B23C 2200/0477* (2013.01); *B23C 2200/125* (2013.01); *B23C 2200/126* (2013.01); *B23C 2200/201* (2013.01); *B23C 2200/208* (2013.01)

(58) Field of Classification Search
CPC ........ B23C 2200/126; B23C 2200/208; B23C 2200/0477; B23C 2200/201
See application file for complete search history.

(56) References Cited

U.S. PATENT DOCUMENTS

| | | | | |
|---|---|---|---|---|
| 9,468,983 | B2* | 10/2016 | Ballas | B23C 5/207 |
| 9,776,259 | B2* | 10/2017 | Saji | B23C 5/207 |
| 9,884,377 | B2* | 2/2018 | Koike | B23C 5/207 |
| 2008/0044241 | A1* | 2/2008 | Koskinen | B23C 5/06 407/103 |
| 2010/0266353 | A1* | 10/2010 | Zitzlaff | B23B 27/145 407/113 |
| 2012/0057943 | A1* | 3/2012 | Zastrozynski | B23C 5/06 407/30 |
| 2012/0070242 | A1* | 3/2012 | Choi | B23C 5/109 407/113 |
| 2013/0251464 | A1* | 9/2013 | Hecht | B23C 5/06 407/48 |
| 2014/0010605 | A1* | 1/2014 | Smilovici | B23C 5/06 407/42 |
| 2014/0334890 | A1* | 11/2014 | Takahashi | B23C 5/109 407/114 |
| 2015/0139744 | A1* | 5/2015 | Harif | B23B 51/02 407/69 |
| 2016/0023285 | A1* | 1/2016 | Saji | B23C 5/207 407/33 |
| 2016/0082528 | A1* | 3/2016 | Ballas | B23C 5/207 407/48 |
| 2016/0375506 | A1* | 12/2016 | Koike | B23C 5/06 407/48 |

FOREIGN PATENT DOCUMENTS

| | | | | |
|---|---|---|---|---|
| JP | WO 2014021314 | A1 * | 2/2014 | ............ B23C 5/06 |
| JP | WO 2014081011 | A1 * | 5/2014 | ............ B22F 7/06 |
| JP | WO 2015080168 | A1 * | 6/2015 | ............ B23C 5/109 |

* cited by examiner

DOUBLE-SIDED MILLING CUTTING INSERT AND MILLING TOOL

The present invention relates to a double-sided milling cutting insert and to a milling tool.

BACKGROUND OF THE INVENTION

Field of the Invention

In the art of machining of materials by milling it is commonly known to use milling tools comprising a tool holder which is provided with one or more insert receiving portions to which milling cutting inserts can be attached. Typically, the tool holder is manufactured from a tough material such as tool steel, while the milling cutting inserts are manufactured from a particularly hard and wear-resistant material, such as cemented carbide, cermet or ceramic. In these cases, the cutting edges engaging the material to be machined are realized in the milling cutting inserts which can be exchanged after the cutting edges have worn off.

In many cases, the milling cutting inserts are realized as thus-called indexable milling cutting inserts comprising a plurality of individually useable cutting edge portions which can subsequently be brought into an active cutting position after the previous one has been worn off. This realization enables a particularly efficient operation of the milling tool. Indexation, i.e. bringing a subsequent individually useable cutting edge portion into an active cutting position, is typically performed by rotating the cutting insert by a predetermined amount about a symmetry axis and/or by turning the cutting insert upside-down, in the case of a double-sided cutting insert comprising useable cutting edge portions both at an intersection of a top side and a side surface and at an intersection of a bottom side and the side surface.

In order to increase productivity, it has been attempted to realize more and more individually useable cutting edge portions in a milling cutting insert. In this attempt, a trend could be seen towards double-sided cutting inserts having a first cutting edge at the intersection of a top side with a side surface and a second cutting edge at the intersection of a bottom side with the side surface. However, depending on the specific intended milling operation, with an increasing number of individually useable cutting edge portions it becomes more and more complicated to adequately protect the cutting edge portions arranged along the bottom side of the cutting insert while machining with cutting edge portions arranged at the intersection of the top side and the side surface, and vice versa.

BRIEF SUMMARY OF THE INVENTION

It is an object of the present invention to provide an improved milling cutting insert and an improved milling tool which enable milling of shoulders of substantially 90 degrees and achieve a high surface quality in a particularly efficient and reliable manner.

The object is solved by a double-sided milling cutting insert according to the main claim. Further developments are specified in the dependent claims.

The double-sided milling cutting insert comprises a top side, a bottom side, a side surface, a first cutting edge arranged at an intersection of the top side and the side surface, a second cutting edge arranged at an intersection of the bottom side and the side surface, a first symmetry axis, and a reference plane extending perpendicular to the first symmetry axis and virtually dividing the cutting insert into two halves. Each of the first and second cutting edges comprises three cutting edge portions which are subsequently useable by indexing. The cutting edge portions each comprise a cutting corner, a main cutting edge adjacent to one side of the cutting corner, and a wiper edge adjacent to the other side of the cutting corner. The wiper edge is connected to the main cutting edge of an adjacent cutting edge portion by a transition edge portion. The main cutting edge is inclined towards the reference plane with increasing distance from the cutting corner and the wiper edge is inclined towards the reference plane with increasing distance from the cutting corner, such that each of the first and second cutting edges has the largest distance to the reference plane in the regions of the cutting corners. The side surface comprises a plurality of main clearance surfaces adjacent to the respective main cutting edges, a plurality of secondary clearance surfaces adjacent to the respective wiper edges, and a plurality of curved corner surfaces adjacent to the respective cutting corners. In a direction from the top surface to the bottom surface, the curved corner surfaces adjacent to the cutting corners of the first cutting edge transform into the secondary clearance surfaces adjacent to the wiper edges of the second cutting edge via transitional surfaces such that the curved corner surfaces protrude further to the outside than the secondary clearance surfaces.

Since the milling cutting insert is double-sided, a large number of individually useable cutting edge portions is provided. Due to the specific features of the double-sided milling cutting insert according to the invention, relatively long main cutting edges and wiper edges are provided which enable particularly efficient milling under various conditions. Further, substantially 90 degrees shoulders can be reliably machined with a high resulting surface quality. Due to the specific shape of the wiper edges, main cutting edges and the side surface in the regions adjacent to the cutting corner, the cutting portions which are arranged in an inactive position, i.e. not participating in the current machining operation, are reliably prevented from undesired damage. Preferably, the main clearance surfaces are substantially flat. Preferably, also the secondary clearance surfaces are substantially flat. It has to be noted that in the present context the terms "top side" and "bottom side" are used for a convenient explanation only and that, of course, the top side can also be arranged below the bottom side or on the side and vice versa, depending on the current orientation of the cutting insert. Thus, the terms "top" and "bottom" are not to be understood in a restricting manner.

According to a further development, the wiper edge is substantially straight in a top view onto the top side. This enables a high surface quality of the resulting surface on the workpiece.

According to a further development, the transitional surfaces have a concave shape. In this case, a smooth transition between the corner surface on one side of the cutting insert and the secondary clearance surface on the respective other side of the cutting insert is provided which can conveniently be produced either by grinding of the sintered cutting insert or by appropriate shaping already in the die of a powder metallurgy production process of the cutting insert.

According to a further development, each of the secondary clearance surfaces is substantially flat and extends along the respective wiper edge and the adjacent transitional edge. This enables a particularly reliable and cost-efficient production process.

According to a further development, the cutting insert comprises three main clearance surfaces each extending from a main cutting edge of the first cutting edge to a main cutting edge of the second cutting edge. In this case, the degree of complexity of the main clearance surfaces is very low such that cost-efficient and reliable production is enabled.

If, in a top view onto the top surface, an outer contour of the first cutting edge is not in alignment with the outer contour of the second cutting edge, the inactive cutting edge portions of the second cutting edge can be reliably protected in a machining operation which uses a cutting edge portion of the first cutting edge, and vice versa.

Preferably, in a top view onto the top surface, the first cutting edge has an outer contour of a triangle with obliquely cut-off corners and the wiper edges and transition edge portions are formed along the obliquely cut-off corners. This realization enables particularly long main cutting edges and wiper edges and at the same time reliable protection of the inactive cutting edge portions.

According to a further development, in top view onto the top side, the wiper edge and the main cutting edge adjacent to the same cutting corner enclose an internal angle which is larger than 92°, preferably larger than 94°. This arrangement enables mounting of the milling cutting insert to an insert receiving portion of a tool holder at a large axial tilting angle and at a radial tilting angle such that the inactive cutting edge portion at the respective other side of the cutting insert can be reliably protected while at the same time enabling milling of substantially 90 degrees shoulders.

Preferably, in top view onto the top side, the main cutting edges of the first cutting edge are aligned with the main cutting edges of the second cutting edge, while the wiper edges of the first cutting edge extend oblique to the wiper edges of the second cutting edge. In this case, six independently useable cutting edge portions for milling of 90 degrees corners can reliably be provided on the double-sided milling cutting insert.

According to a preferred realization, the length of the main cutting edge is larger than four times the length of the wiper edge, preferably larger than five times the length of the wiper edge.

The object is also solved by a milling tool according to claim 11. The milling tool comprises: a tool holder with a plurality of insert receiving portions for accommodating milling cutting inserts and at least one double-sided indexable milling cutting insert as described above. The indexable milling cutting insert is fastened to an insert receiving portion of the holder such that an active wiper edge extends substantially perpendicular to the rotational axis.

The milling tool achieves the advantages which have been described above with respect to the double-sided milling cutting insert.

BRIEF DESCRIPTION OF THE SEVERAL VIEWS OF THE DRAWING

Further advantages and developments will become apparent from the following description of an embodiment with reference to the drawings.

In the figures.

DESCRIPTION OF THE INVENTION

Figure 1:
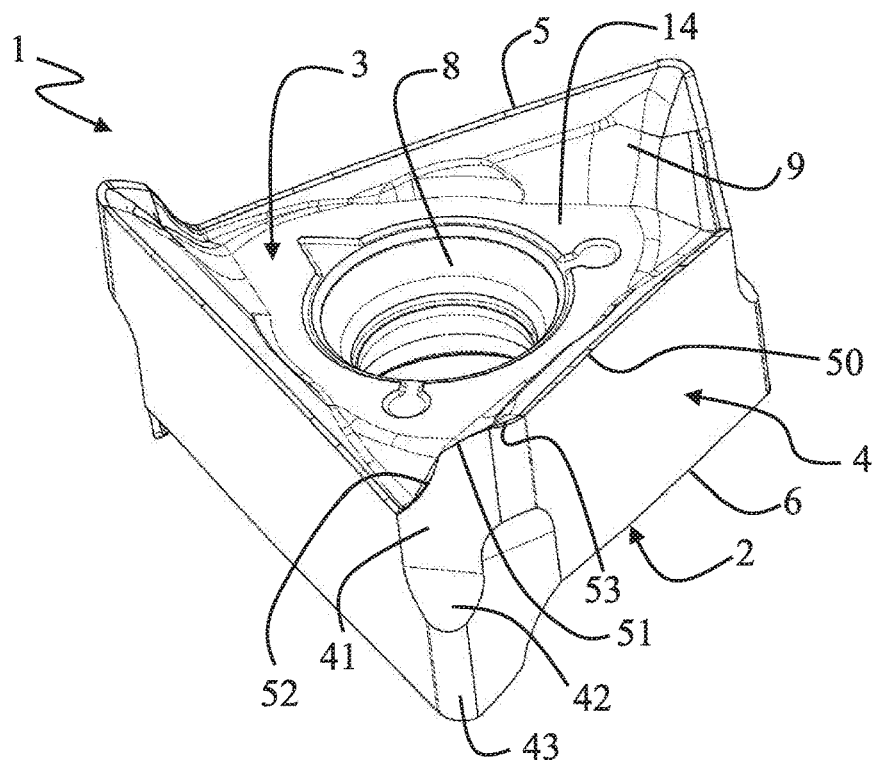
FIG. 1: is a perspective illustration of a double-sided milling cutting insert according to an embodiment.

An embodiment will now be described with reference to FIGS. 1 to 5. First, a double-sided milling cutting insert 1 according to the embodiment will be described with reference to FIGS. 1 to 3.

The double-sided milling cutting insert 1 according to the embodiment is realized as an indexable milling cutting insert which has a plurality of individually useable cutting edge portions 7, in particular six such cutting edge portions in the depicted embodiment. The milling cutting insert 1 has a top side 2, a bottom side 3, and a side surface 4 which connects the top side 2 and the bottom side 3. The side surface 4 comprises a plurality of part surfaces which will be described more in detail further below.

A first cutting edge 5 is formed at the intersection of the top side 2 and the side surface 4. A second cutting edge 6 is formed at the intersection of the bottom side 3 and the side surface 4. The double-sided milling cutting insert 1 comprises a symmetry axis Z, about which the milling cutting insert 1 comprises three-fold rotational symmetry; i.e. the milling cutting insert 1 will appear identical when rotated by 120° (=360°*1/3) or by 240° (=360°*2/3) about the symmetry axis Z. Further, the milling cutting insert 1 is symmetrical with respect to a reference plane XY which extends perpendicular to the symmetry axis Z and virtually divides the cutting insert 1 into two equal halves. Due to this symmetry, the top side 2 is formed identical to the bottom side 3 (except for some possible indicators aiding in the subsequent use of individually useable cutting edge portions) and the first cutting edge 5 is formed identical to the second cutting edge 6. Thus, for avoiding unnecessary repetition, only the top side 2 and the first cutting edge 5 will be described more in detail and it has to be understood that the bottom side 3 and the second cutting edge 6 have corresponding features.

Figure 3:
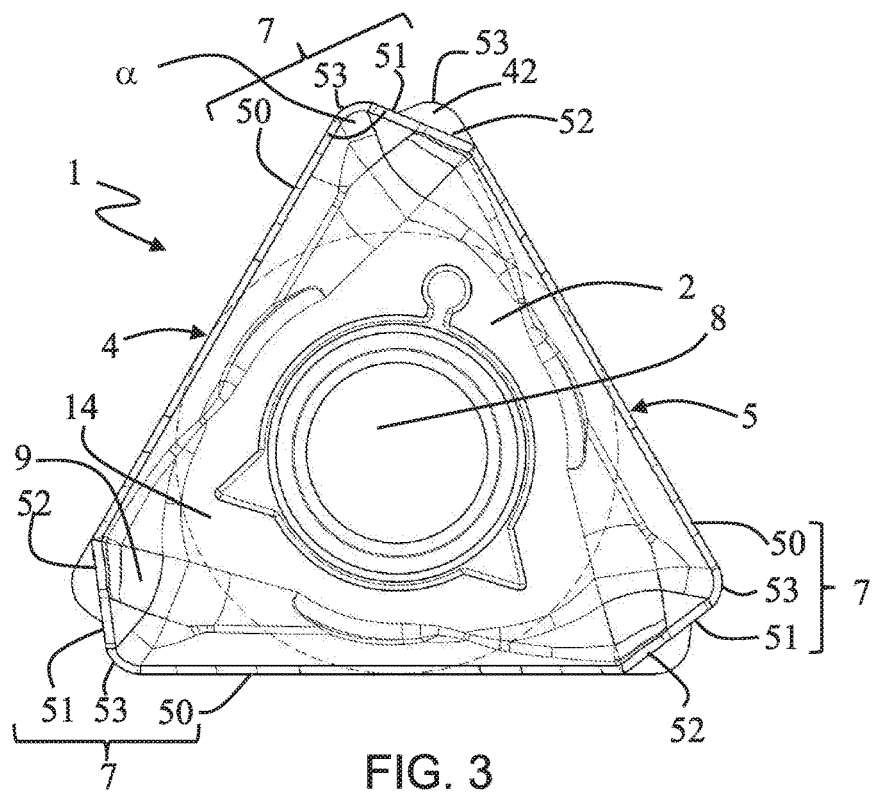
FIG. 3: is a top view of the double-sided milling cutting insert of FIG. 1.

As can be seen in particular in FIG. 3, in top view onto the top side 2, the first cutting edge 5 has a shape of a triangle with obliquely cut-off corners. Main cutting edges 50 are formed along the long sides of the triangle and wiper edges 51 and transition edge portions 52 are formed along the obliquely cut-off corners of the triangle. The main cutting edges 50 are each arranged adjacent to one side of a cutting corner 53 and the wiper edges 51 are each arranged adjacent to the respective other side of the cutting corner 53. The main cutting edge 50, the cutting corner 53 adjacent thereto and the wiper edge 51 adjacent to the latter together form a cutting edge portion 7 which can individually be used in a machining operation. As can be seen in FIG. 3, the first cutting edge 5 comprises three such cutting edge portions 7. As the second cutting edge 6 also comprises three such cutting edge portions 7, the double-sided milling cutting insert 1 comprises six individually useable cutting edge portions 7 which can be brought into active cutting positions by indexation. The wiper edge 51 of a cutting edge portion 7 is connected to the main cutting edge 50 of the adjacent cutting edge portion 7 by a transition edge portion 52.

In view of the symmetry of the milling cutting insert 1, only one cutting edge portion 7 and transition edge portion 52 will be described in order to avoid repetitions.

Figure 2:
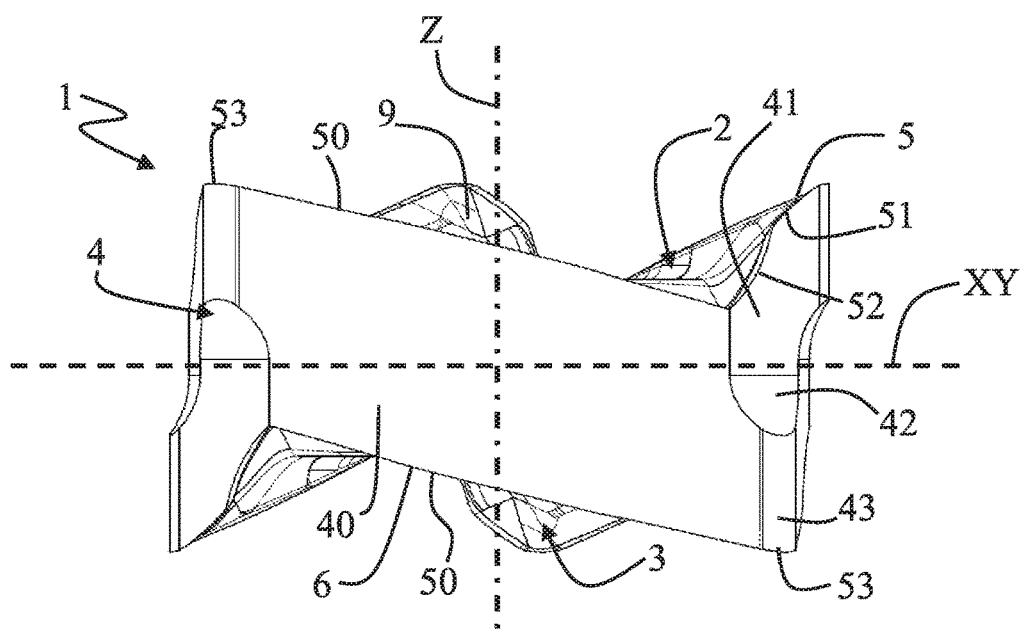
FIG. 2: is a side view of the double-sided milling cutting insert of FIG. 1.

As can be seen in FIG. 2, the main cutting edge 50 has a first distance to the reference plane XY in its region adjacent to the cutting corner 53 and is inclined downward towards the reference plane XY with increasing distance from the cutting corner 53. In the depicted embodiment, the main cutting edge 50 monotonously approaches the reference plane XY with increasing distance from the cutting corner 53. As can be seen in FIG. 3, the main cutting edge 53 is substantially straight when seen in a top view onto the top side 2.

Further, as can also be seen in FIG. 2, the wiper edge 51 has the highest distance to the reference plane XY in its region adjacent to the cutting corner 53 and is inclined downward towards the reference plane XY with increasing distance from the cutting corner 53. In the depicted embodiment, the wiper edge 51 also monotonously approaches the reference plane XY with increasing distance from the cutting corner 53. As can be seen in FIG. 3, the wiper edge 51 is substantially straight when seen in a top view onto the top side 2.

As can be seen in the top view of FIG. 3, the main cutting edge 50 and the wiper edge 51 which are adjacent to the same cutting corner 53 enclose an internal angle α which is larger than 92°, in particular larger than 94°. In the embodiment shown, the angle α is approximately 96°.

The transition edge portion 52 is substantially straight in a top view onto the top side 2 and is substantially aligned with the wiper edge 51. As can be seen in FIG. 3, the transition edge portion 52 steeply drops from the height relative to the reference plane XY at the side of the wiper edge 51 to the height of the main cutting edge 50 of the adjacent cutting edge portion 7.

As a result of the described shape of the main cutting edge 50, the wiper edge 51 and the transition edge portion 52, the cutting corners 53 form the regions of the first cutting edge 5 having the largest distance from the reference plane XY. Due to the symmetry of the milling cutting insert 1, the same holds for the second cutting edge 6.

As can be seen in FIG. 3, the main cutting edge 50 is much longer than the wiper edge 51, in particular the length of the main cutting edge 50 amounts to more than four times the length of the wiper edge 51, preferably to more than five times the length of the wiper edge 51. In the depicted embodiment, the main cutting edge 50 is more than six times longer than the wiper edge 51.

Next, the shape of the side surface 4 will be explained more in detail.

As can be seen in the Figures, the side surface 4 comprises a substantially flat main clearance surface 41 which is formed adjacent to the main cutting edge 50. In the embodiment shown, the main clearance surface 41 extends in an uninterrupted manner from the main cutting edge 50 of the first cutting edge 5 to a main cutting edge 50 of the second cutting edge 6. However, in an alternative realization it can also be possible that the main clearance surface 41 does not extend to the main cutting edge 50 of the respective other one of the cutting edges. For example, the main clearance surface 41 can also be interrupted by a recess or the like. In the embodiment, the main clearance surface 41 extends in parallel to the symmetry axis Z such that a cutting insert inherent clearance angle of 0 degrees is realized along the whole main cutting edge 50. In this context it should be noted that the term "cutting insert inherent clearance angle" is used to determine the clearance angle which is determined by the cutting insert itself, while the "actual clearance angle" which is effective during machining does also depend on the relative orientation of the milling cutting insert 1 in the tool holder of the milling tool.

As can further be seen in the Figures, the side surface 4 comprises a convexly curved corner surface 43 adjacent to each corner cutting edge 53. For example, the curved corner surface 43 can have a substantially cylindrical shape, a substantially conical shape or the like. In the specific embodiment, the corner cutting edge 53 is arranged at a cutting insert inherent clearance angle of substantially 0 degrees. Adjacent to the wiper edge 51, the side surface 4 comprises a secondary clearance surface 41. In the depicted embodiment, the secondary clearance surface 41 is substantially flat and extends along the wiper edge 51 and the adjacent transition edge portion 52. In the specific embodiment shown, the secondary clearance surface 41 extends at a cutting insert inherent (secondary) clearance angle of substantially 0 degrees.

Although cutting insert inherent clearance angles of substantially 0 degrees have been described with regard to the main clearance surfaces 40, the curved corner surfaces 43 and the secondary clearance surfaces 41 which enable particularly cost-efficient production of the milling cutting insert 1, other cutting insert inherent clearance angles different from 0 degrees can also be realized for all or some of these parts of the side surface 4.

In a direction from the first cutting edge 5 towards the second cutting edge 6, the secondary clearance surfaces 41 adjacent to a wiper edge 51 of the first cutting edge 5 transforms into a curved corner surface 43 adjacent to a cutting corner 53 of the second cutting edge 6 via a transitional surface 42. In the depicted embodiment, the transitional surface 42 is concavely shaped. It is however also possible that the transitional surface 42 can have another shape, e.g. be formed by a substantially flat surface.

As a result of this, the curved corner surfaces 43 of the cutting corners 53 of the first cutting edge 5 protrude further outward than the transition edge portions 52 and parts of the wiper edges 51 of the second cutting edge 6. Correspondingly, the curved corner surfaces 43 of the cutting corners 53 of the second cutting edge 6 protrude further outward than the transition edge portions 52 and parts of the wiper edges 51 of the first cutting edge 5. In other words, the cutting corners 53 and the corresponding curved corner surfaces 43 in each case form an overhang over the respective other cutting edge.

Thus, in a top view onto the top surface 2, an outer contour of the first cutting edge 5 is not in alignment with the outer contour of the second cutting edge 6. While the main cutting edges 50 of the first cutting edge 5 are aligned with the main cutting edges 50 of the second cutting edge 6 in a top view onto the top surface, the wiper edges 51 of the second cutting edge 6 extend obliquely to the wiper edges 51 of the first cutting edge 5. In particular, a wiper edge 51 of the first cutting edge 5 and a corresponding wiper edge 51 of the second cutting edge 6 are arranged at an obtuse internal angle relative to each other.

Preferably, the secondary clearance surfaces 41 and the transition surfaces 42 of the milling cutting insert 1 according to the embodiment can be ground. In this case, the milling cutting insert 1 can efficiently be produced from a pulverulent material in a powder metallurgy production process by compaction in a rather simple die and with subsequent grinding of the thus formed body either as a green part or after sintering. Preferably, the milling cutting insert 1 is fabricated from cemented carbide or cermet material. Further, the milling cutting insert 1 can preferably be coated, e.g. by physical vapor deposition (PVD) or by chemical vapor deposition (CVD). The coating can be provided on the whole milling cutting insert 1 or on only parts thereof.

The top side 2 and the bottom side 3 are provided with chip surfaces 9 adjacent to the main cutting edges 50, the cutting corners 53 and the wiper edges 51. As can be seen in FIG. 1 and FIG. 2, in the region of the cutting corners 53 the chip surface 9 steeply drops towards a central plateau 14 with increasing distance from the cutting corner 53. The chip surfaces 9 are appropriately adapted in order to guide the chips during the machining operation. Further, the chip surfaces 9 can also be provided with chip breaker structures.

Figure 4:
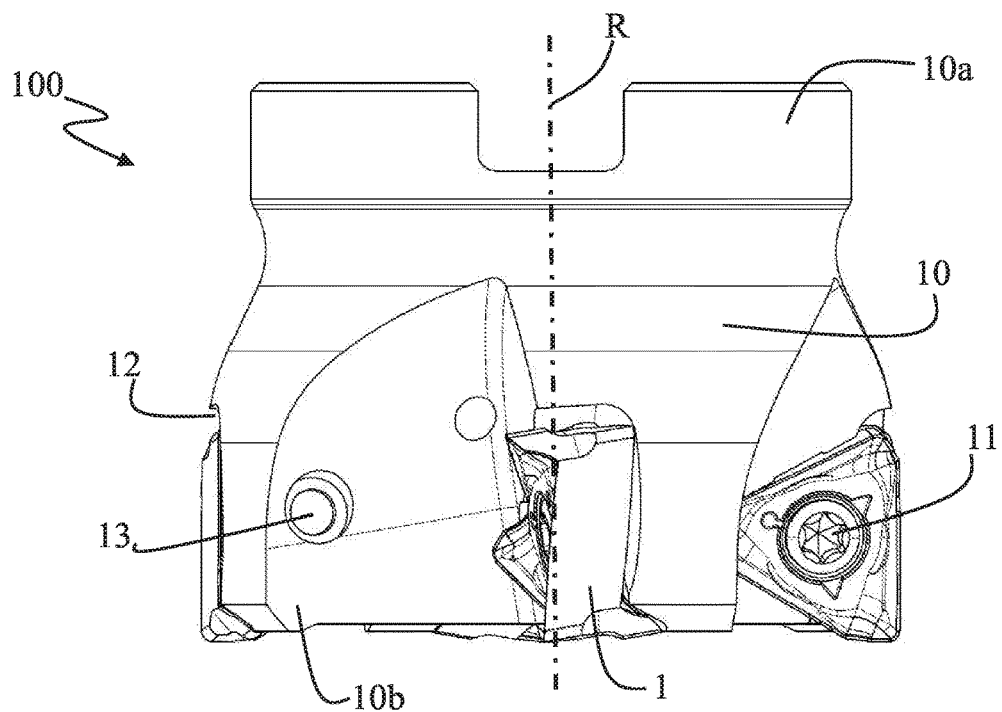
FIG. 4: is a side view of a milling tool comprising a tool holder and a plurality of double-sided milling cutting inserts according to the embodiment mounted to respective insert receiving portions of the tool holder.
Figure 5:
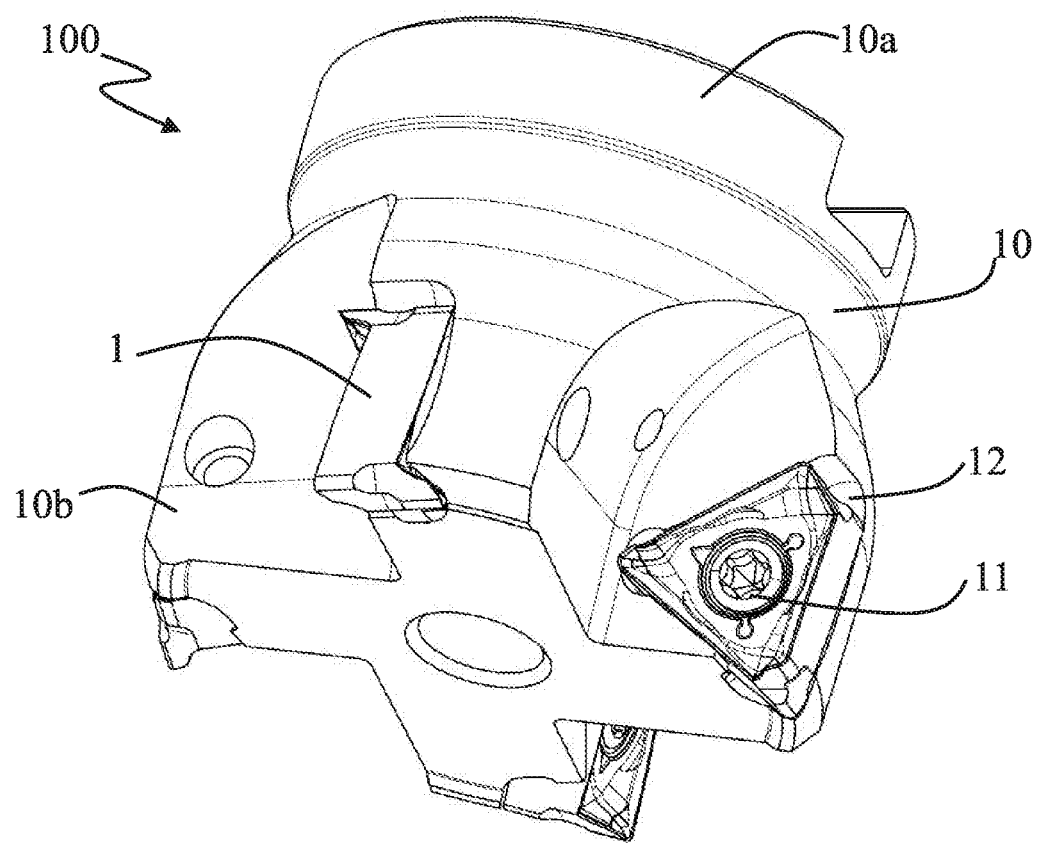
FIG. 5: is a perspective illustration of the milling tool of FIG. 4.

As can further be seen in the Figures, the milling cutting insert 1 according to the embodiment is provided with a through-hole 8 capable of receiving a fastening screw 11 for fastening the milling cutting insert to a tool holder 10 of a milling tool 100. As is schematically shown in FIGS. 4 and 5, the milling tool 100 comprises a tool holder 10 having a first end 10a adapted to be connected to a milling machine and a second end 10b provided with a plurality of cutting insert receiving portions 12 which are adapted for accommodating milling cutting inserts 1 according to the embodiment. The tool holder 10 comprises a rotational axis R about which the tool holder 10 is rotated during machining. Although a specific embodiment is shown in FIGS. 4 and 5 in which the tool holder 10 comprises four such insert receiving portions 12, also other realizations are possible. For example, the tool holder 10 can also have less insert receiving portions 12 or more insert receiving portions 12. The insert receiving portions 12 are adapted for accommodating the double-sided milling cutting inserts 1 according to the embodiment with similar orientations.

Each of the insert receiving portions 12 is provided with a threaded bore 13 adapted for cooperating with a fastening screw 11 the threaded shank of which is passed through the through-hole 8 of the milling cutting insert 1. Further, each of the insert receiving portions 12 comprises a plurality of abutment surfaces for supporting the mounted milling cutting insert 1 in a predetermined orientation such that one of the distinct cutting edge portions 7 of the milling cutting insert 1 is in an active cutting position (i.e. a position engaging the workpiece with a main cutting edge 50, a cutting corner 53 and a wiper edge 51) while the other cutting edge portions 7 are in inactive positions in which they are protected from deterioration.

As can be seen in FIG. 4 and in FIG. 5, the insert receiving portions 12 are adapted such that the milling cutting inserts 1 are mounted with a predetermined axial tilting angle and with a predetermined radial tilting angle such that the inactive cutting edge portions 7 are securely protected.

Due to the particular orientation of the main cutting edge 50, the cutting corner 53 and the wiper edge 51 of the active cutting edge portion 7 together with the axial tilting angle and the radial tilting angle determined by the insert receiving portion 12, the milling tool 100 is capable of machining corners of substantially 90 degrees in a workpiece. During such machining, the shorter wiper edges 51 which are arranged substantially perpendicular to the rotational axis R of the tool holder 10 serve for finishing the machined surface of the workpiece. In this context, the wiper edges 51 usually will not extend exactly perpendicular to the rotational axis R but will instead be slightly inclined (typically by less than 1 degree) as is well known in this technical field.

The invention claimed is:

1. A double-sided milling cutting insert comprising:
a top side;
a bottom side;
a side surface;
a first cutting edge disposed at an intersection of said top side and said side surface;
a second cutting edge disposed at an intersection of said bottom side and said side surface;
a first symmetry axis;
a reference plane extending perpendicular to the first symmetry axis and virtually dividing the double-sided milling cutting insert into two halves;
each of said first and second cutting edges having three cutting edge portions being subsequently useable by indexing, said cutting edge portions having a cutting corner, a main cutting edge adjacent to one side of said cutting corner, and a wiper edge adjacent to the other side of said cutting corner, said wiper edge being connected to said main cutting edge of an adjacent cutting edge portion by a transition edge portion;
said main cutting edge inclines towards the reference plane with an increasing distance from said cutting corner, and said wiper edge is inclined towards the reference plane with increasing distance from said cutting corner such that each of said first and second cutting edges has a largest distance to the reference plane in regions of said cutting corners; and
said side surface contains transitional surfaces, a plurality of main clearance surfaces adjacent to main cutting edges, a plurality of secondary clearance surfaces adjacent to wiper edges, and a plurality of curved corner surfaces adjacent to cutting corners, and in a direction from said top side to said bottom side, said curved corner surfaces adjacent to said cutting corners of said first cutting edge transform into said secondary clearance surfaces adjacent to said wiper edges of said second cutting edge via said transitional surfaces such that said curved corner surfaces protrude further to an outside than said secondary clearance surfaces.

2. The double-sided milling cutting insert according to claim 1, wherein said wiper edge is substantially straight in a top view onto said top side.

3. The double-sided milling cutting insert according to claim 1, wherein said transitional surfaces have a concave shape.

4. The double-sided milling cutting insert according to claim 1, wherein each of said secondary clearance surfaces is substantially flat and extends along a respective one of said wiper edges and an adjacent said transitional edge portion.

5. The double-sided milling cutting insert according to claim 1, wherein said plurality of main clearance surfaces is three main clearance surfaces each extending from a respective said main cutting edge of said first cutting edge to a respective said main cutting edge of said second cutting edge.

6. The double-sided milling cutting insert according to claim 1, wherein, in a top view onto said top side, an outer contour of said first cutting edge is not in alignment with an outer contour of said second cutting edge.

7. The double-sided milling cutting insert according to claim 1, wherein, in a top view onto said top side, said first cutting edge has an outer contour of a triangle with obliquely cut-off corners and said wiper edges and said transition edge portions are formed along obliquely cut-off corners.

8. The double-sided milling cutting insert according to claim 1, wherein, in top view onto said top side, said wiper edge and said main cutting edge adjacent to a same said cutting corner enclose an internal angle which is larger than 92°.

9. The double-sided milling cutting insert according to claim 1, wherein, in top view onto said top side, said main cutting edges of said first cutting edge are aligned with said main cutting edges of said second cutting edge, while said wiper edges of said first cutting edge extend obliquely to said wiper edges of said second cutting edge.

10. The double-sided milling cutting insert according to claim 1, wherein said main cutting edge has a length being larger than four times a length of said wiper edge.

11. The double-sided milling cutting insert according to claim 1, wherein said main cutting edge has a length being larger than five times a length of said wiper edge.

12. The double-sided milling cutting insert according to claim 1, wherein, in top view onto said top side, said wiper edge and said main cutting edge adjacent to a same said cutting corner enclose an internal angle which is larger than 94°.

13. A milling tool, comprising:
- a tool holder having a plurality of insert receiving portions for accommodating milling cutting inserts; and
- at least one double-sided indexable milling cutting insert according to claim 1, said double-sided indexable milling cutting insert being fastened to one of said insert receiving portions of said tool holder such that an active said wiper edge extends substantially perpendicular to a rotational axis of said tool holder.

\* \* \* \* \*